(12) United States Patent
Leban

(10) Patent No.: US 6,742,616 B2
(45) Date of Patent: Jun. 1, 2004

(54) HYBRID AIR BOOST VEHICLE AND METHOD FOR MAKING SAME

(76) Inventor: Michael F. Leban, 5010 Colonial Ave., Norfolk, VA (US) 23508

( * ) Notice: Subject to any disclaimer, the term of this patent is extended or adjusted under 35 U.S.C. 154(b) by 8 days.

(21) Appl. No.: 09/880,094

(22) Filed: Jun. 14, 2001

(65) Prior Publication Data
US 2002/0021023 A1 Feb. 21, 2002

Related U.S. Application Data
(60) Provisional application No. 60/212,494, filed on Jun. 20, 2000.

(51) Int. Cl.[7] ............................. B62D 35/00; B62V 1/00
(52) U.S. Cl. ..................... 180/116; 180/127; 296/180.4
(58) Field of Search ................................ 180/127, 130, 180/116; 296/180.1, 180.2, 191, 198, 180.4, 180.5

(56) References Cited

U.S. PATENT DOCUMENTS

| 4,172,506 A | * | 10/1979 | Terry ......................... 180/125 |
| 4,386,801 A | * | 6/1983 | Chapman et al. ........... 296/1 S |
| 4,455,045 A | * | 6/1984 | Wheeler .................... 296/180.1 |
| 4,601,508 A | * | 7/1986 | Kerian ......................... 296/1 S |
| 4,611,847 A | | 9/1986 | Sullivan ..................... 296/1 S |
| 4,746,160 A | | 5/1988 | Wiesemeyer ................. 296/1 S |
| 4,978,162 A | | 12/1990 | Labbe ...................... 296/180.2 |
| 5,058,945 A | | 10/1991 | Elliott, Sr. et al. ........ 296/180.5 |
| 5,119,897 A | * | 6/1992 | Moriwake .................... 180/127 |
| 5,222,698 A | | 6/1993 | Nelson et al. ............... 244/203 |
| 5,280,990 A | * | 1/1994 | Rinard ..................... 296/180.1 |
| 5,407,245 A | * | 4/1995 | Geropp ..................... 296/180.1 |
| 5,498,059 A | | 3/1996 | Switlik ..................... 296/180.1 |
| 5,560,443 A | * | 10/1996 | DuBose ....................... 180/121 |
| 6,068,328 A | | 5/2000 | Gazdzinski .................. 296/185 |
| 6,092,861 A | | 7/2000 | Whelan .................... 296/180.2 |
| 6,200,069 B1 | | 3/2001 | Miller ........................ 405/196 |
| 6,216,599 B1 | | 4/2001 | Cavanagh ................... 104/23.2 |
| 6,220,193 B1 | | 4/2001 | Dilks ......................... 114/67 A |
| 6,309,010 B1 | * | 10/2001 | Whitten .................... 296/180.4 |
| 6,378,932 B1 | * | 4/2002 | Fasel et al. ............... 296/180.5 |
| 6,409,252 B1 | * | 6/2002 | Andrus .................... 296/180.4 |

* cited by examiner

Primary Examiner—Lesley D. Morris
Assistant Examiner—Tony Winner
(74) Attorney, Agent, or Firm—George F. Helfrich

(57) ABSTRACT

A hybrid air boost vehicle makes use of the porous panels and suction devices of a vehicle aerodynamic drag reduction system, and makes use of the air consumed by such a system, to provide the energy and air to power a land or water based ground effects vehicle. Energy and air consumed by the suction system, and normally wasted, is recycled by providing an air cushion to partially support the vehicle. The entire hybrid air boost vehicle system is more efficient than either a drag reduction system or a ground effects vehicle alone, and the benefits of both are realized, as well as benefits unique to the hybrid vehicle.

13 Claims, 14 Drawing Sheets

HYBRID AIR BOOST VEHICLE AND METHOD FOR MAKING SAME

This application claims the benefit of U.S. Provisional Application No. 60/212,494, filed Jun. 20, 2000.

BACKGROUND OF THE INVENTION

1. Field of the Invention

This invention relates generally to ground and water based vehicles. It relates particularly to vehicles with reduced aerodynamic drag, in combination with reduced propulsion system wear. It also relates particularly to a method for making a ground or water based vehicle with reduced aerodynamic drag in combination with reduced propulsion system wear.

2. Description of the Related Art

Inventions related to the improvement in drag reduction for trucks, trains, and other ground based vehicles have been in existence for fifty years or more. Several patents have been issued for inventions which reduce vehicle drag by adding aerodynamically shaped hardware to the existing vehicle structure. Some such devices are semi-spherical in geometry, some are conical, some angular, some inflatable, some rigid, some comprised of hinged panels, some fabricated from solid material, and some utilizing porous surfaces. Other drag reduction systems utilize powered suction or blowing to control boundary layer aerodynamic effects along the surface of the vehicle. Some inventions utilize a combination of the drag reduction techniques above, and patents exist for other methods as well.

Likewise, ground effects or hovercraft technology has been in existence for many years. Ground effects vehicles historically have utilized a cushion of air to completely lift the vehicle off the ground, rail, or water. Jet or propeller driven thrust is typically used to propel the vehicle, and some form of rudder, or mechanical channel or rail, is used for steering.

Studies have shown that suction or blowing powered drag reduction technology can be effective, reducing aerodynamic drag on large vehicles by as much as thirty-five percent, and thereby significantly improving fuel economy. Such systems are often wasteful in other ways, however. For example, a considerable amount of energy is expended by such systems, arguably enough to nullify the savings produced by the drag reduction. As a result, the drag reduction may come at a cost which makes implementation prohibitive.

Similarly, ground effects vehicles, e.g. hovercraft, consume great amounts of energy in order to lift the vehicle entirely off the ground, water, or rail. They can be both expensive and noisy to operate.

It would be beneficial, therefore, to provide an invention which not only reduces aerodynamic drag on a vehicle, but also utilizes the energy expended by the drag reduction system to provide partial lift on the vehicle. The energy required for lift then becomes free of charge. The benefits of drag reduction are still realized, plus added benefits of partial lift are appreciated. Such an invention is of particular value at a time when fuel costs are escalating at an unprecedented rate, and at a time when ecology, recycling, noise pollution, and other environmental concerns are highly significant.

BRIEF SUMMARY OF THE INVENTION

It is therefore an object of the present invention to provide a system which reduces the drag on a vehicle, then makes additional beneficial use of the energy expended and the air collected by the drag reduction system.

It is a related object of the invention to use the energy and air supplied by the drag reduction hardware to provide a system which decreases the wear on a vehicle's propulsion equipment.

It is a further object of the invention to provide a system which decreases the wear on some surfaces over which a vehicle may travel.

These and other objects, features, and advantages of the present invention will become apparent to those skilled in the art through the subsequent descriptions, drawings, and claims.

In accordance with these and other objects, the present invention provides a novel combination of existing aerodynamic drag reduction technology and existing ground effects technology. The novel combination results in a unique and efficient system which provides the benefits of both previous technologies, as well as some benefits which were previously unavailable. The invention is both the vehicle which combines drag reduction and ground effects technology to accomplish the desired benefits, and the method for combining drag reduction and ground effects technology for the same purpose.

In an embodiment of the present invention, porous panels at the trailing end of a vehicle are used to improve the vehicle's aerodynamic shape, thus reducing aerodynamic drag on the vehicle. Aerodynamic drag is further reduced by suction through the surfaces of the porous panels, which provides control of the turbulent boundary layer flow over the panels.

Normally in prior art drag reduction systems, the air suctioned off the boundary layer is exhausted to the environment, serving no further purpose. The present invention recycles the suctioned air, however, and also makes more efficient use of the energy expended by the suction devices, by pumping the suctioned air to an air cushion underneath the vehicle instead of releasing the air to the atmosphere.

The air cushion partially lifts the vehicle, reducing the loading it imparts to its structure and propulsion system (e.g. tires, axles, treads, propellers, etc.) by a desired fractional amount. The reduced loading on the vehicle's propulsion system not only reduces the wear on vehicle hardware, but also reduces the wear on surfaces with which the vehicle's propulsion system may come in contact. The reduced loading also reduces friction between the propulsion system and the surface over which the vehicle travels, potentially further reducing drag on the vehicle. Additionally, the fact that only partial lift is required decreases the amount of power necessary to provide lift, and significantly reduces the noise level produced by the system.

Overall benefits of the present invention include savings in fuel costs, savings in vehicle maintenance and part replacement costs, and savings in road or rail maintenance, or repair to other surfaces contacted by the moving vehicle.

BRIEF DESCRIPTION OF THE SEVERAL VIEWS OF THE DRAWINGS

The present invention will be more fully understood and appreciated from the following detailed description, taken in conjunction with the drawings, in which.

DETAILED DESCRIPTION OF THE INVENTION

The present invention is both a vehicle which combines drag reduction and ground (or surface) effects technology to accomplish a variety of benefits (as described below), and the method for combining drag reduction and ground effects technology for the same purpose.

The invention utilizes the principles and advantages of an air cushion to minimize the load (weight) placed on a ground, rail, or water based vehicle's propelling device, e.g. wheels, tires, axles, treads, belts, or propellers. A gas filled cushion and skirt device is disposed on the underside of any vehicle that is propelled along the surface of the ground or water, whether upon prepared roadways, rails, or off-road, irregular or unprepared surfaces. The invention is a "hybrid" vehicle because unlike existing air cushion (i.e. ground effects, hovercraft) vehicles, this invention allows the vehicle's propelling device (including, but not limited to, wheels, tired, treads, propellers, or belts) to remain in contact with the ground or water in order to perform the propelling/drive function, while the air cushion functions simultaneously to reduce the loading on the wheels, tires, treads, belts, or propellers that remain in contact with the surface.

The air cushion is utilized to significantly reduce the load that the vehicle exerts on the ground or other surface through its propelling device. Resulting advantages over existing technologies include but are not limited to the following: a) increased fuel economy, b) reduced surface or road wear, c) reduced tire/wheel/tread/belt/propeller wear, d) increased ability of the vehicle to transport heavier weight or more cargo without increasing the number or size of the wheels, tires, treads, belts, or propellers, e) improved ability to traverse irregular or unprepared surfaces, f) improved ability to traverse soft or otherwise reduced capacity load bearing surfaces, and g) increased speed.

A key novel aspect of the invention is its combination of drag reduction technology with ground effects technology, such that the drag reduction is accomplished through means known in the art, and benefits of ground effects technology are obtained with no further consumption of energy. Aerodynamic flow shaping and boundary layer suction technology is used to reduce drag on a vehicle, while the same suction hardware, energy consumed, and air removed from the boundary layer is used to support the ground effects system.

Figure 1:
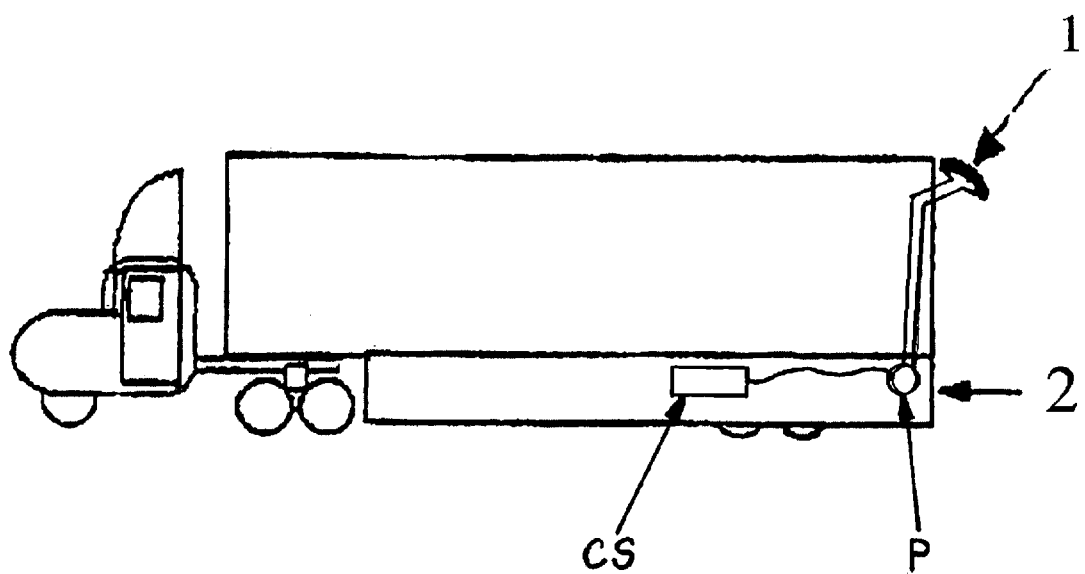
FIG. 1 depicts a side view of a trailer with air cushion boost and drag reduction.
Figure 2:
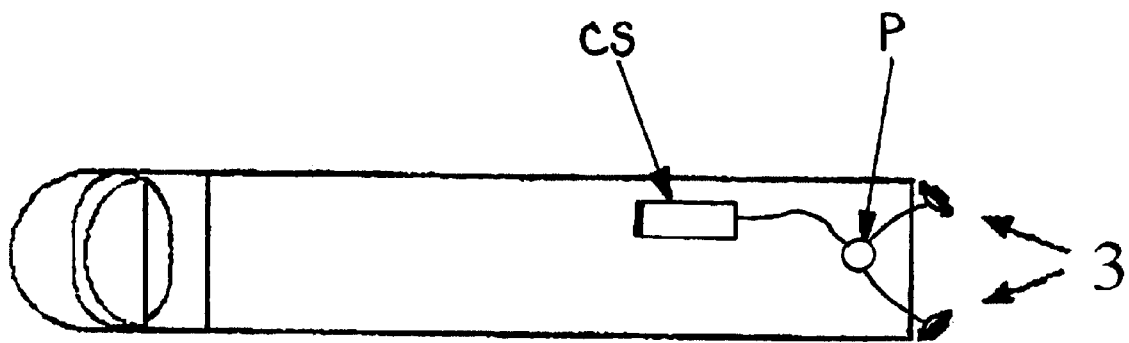
FIG. 2 depicts a top view of a trailer with air cushion boost and drag reduction.

In its best mode, the invention applies to commercial, over the road, 18 wheel type trucks and tractor trailers, reducing aerodynamic and wheel friction drag of such vehicles operating at typical highway speeds. Referring to FIG. 1, a side view of a large truck or tractor-trailer is illustrated, equipped with the present invention. In this application, perforated curved top panel 1 serves to aerodynamically configure air flow at the rear of the vehicle, while providing a porous surface through which suction is accomplished. Air cushion skirt 2 provides a sealing boundary around the bottom of the vehicle, collecting the suctioned air to produce an air cushion partially supporting the vehicle. FIG. 2 is a top view of a similar tractor-trailer combination with perforated side panels 3 on the rear of the vehicle's body. The aerodynamic geometry of top panel 1 and side panels 3, in combination with suction through the porous surfaces of all the perforated panels (top 1 and side 3), serves to significantly reduce base drag on the vehicle.

Figure 3:
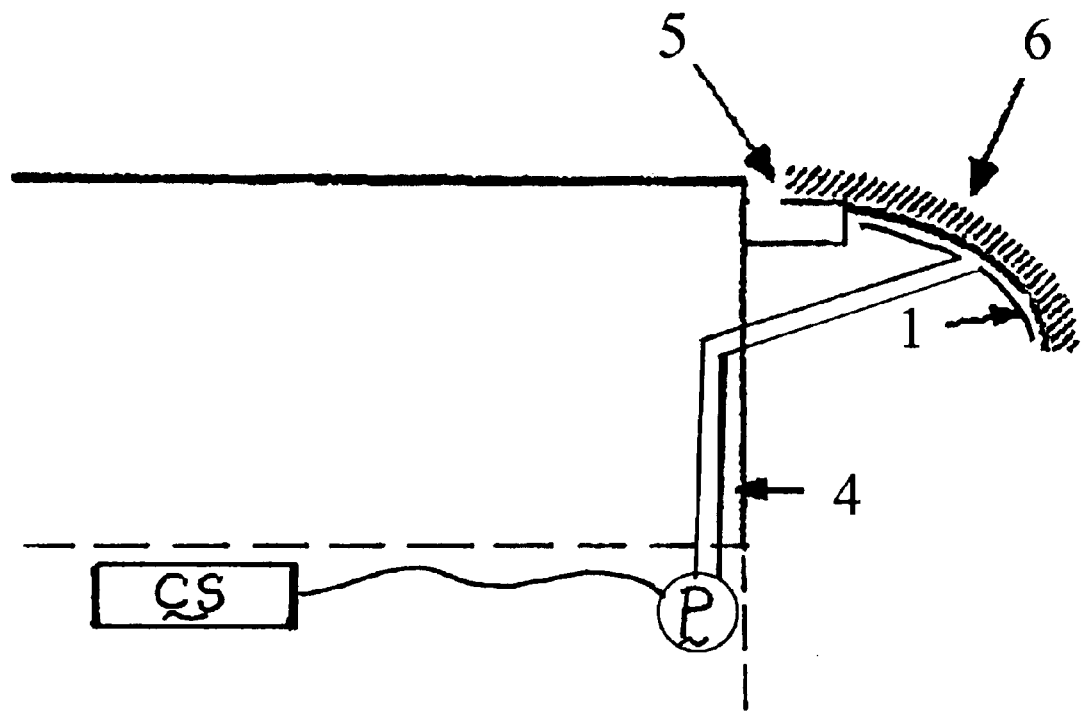
FIG. 3 depicts the upper rear corner of a trailer with drag reduction panels.

FIG. 3 illustrates a closer side view of the top panel 1. Construction and assembly of top panel 1 is typical of all panels, including side panels 3. As shown in FIG. 3, top panel 1 is mounted at the trailing edge of the vehicle such that a slot 5 exists between trailer 4 and top panel 1. Suction through the slot 5 removes the low velocity portion of the boundary layer 6 before it reaches the porous surface of the panel. Additional suction is then used in combination with the aerodynamically designed porous panels (top panel 1, side panels 3) to gradually turn the base flow, in order to minimize downstream separation of the air flow. This greatly reduces the front to rear pressure difference, thereby lowering pressure drag. Porosity for the perforated panels is determined by one skilled and educated in the related art. In general, the perforated panels are solid enough to allow the passage of air over their surfaces, but porous enough so that air can be readily suctioned through the surface by a pump.

Figure 4:
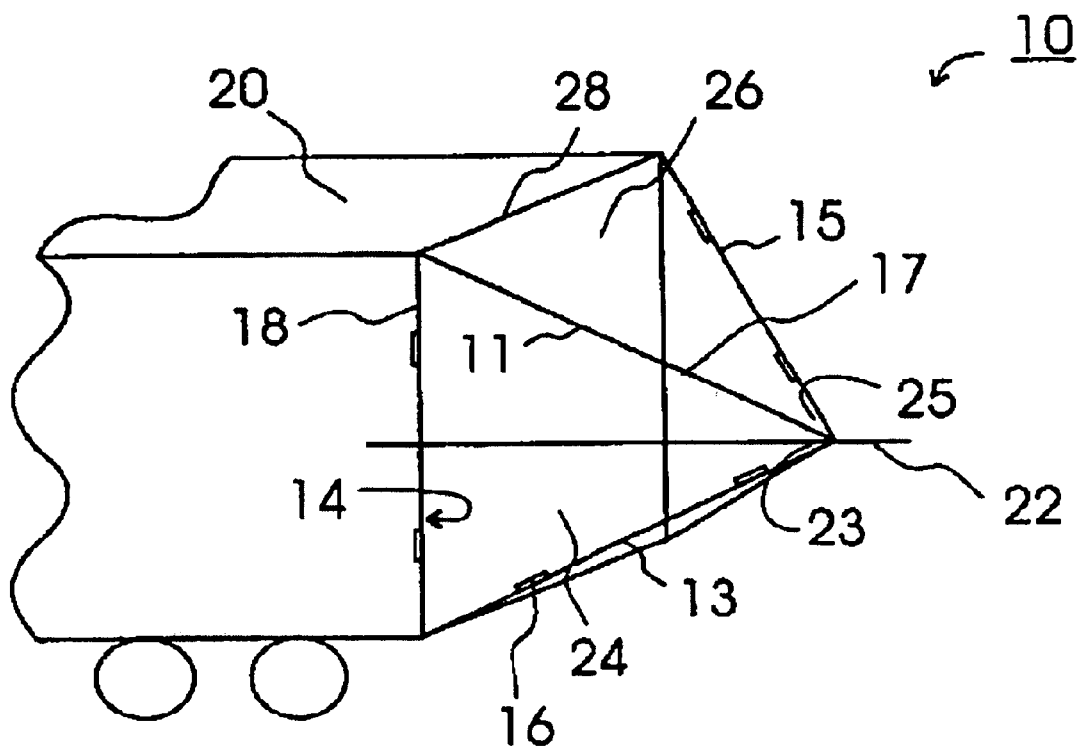
FIG. 4 depicts an example of suitable drag reduction panel geometry using flat panels.

Geometry for the top panel 1 and side panels 3 may vary, but should be such that it creates a more favorable aerodynamic shape for the rear portion of the vehicle. Least expensive to manufacture would be flat panels, as illustrated in FIG. 4. FIG. 4 herein is FIG. 3 of U.S. Pat. No. 6,092,861 by Whelan, hereby incorporated by reference into the present patent application, which indicates (in Column 1, lines 4650) that a pyramid formed by flat panel geometry produces smooth laminar flow around the vehicle and reduces drag.

Although the present invention could encompass panels which form a closed solid such as the pyramid illustrated in FIG. 4, the currently envisioned preferred embodiment of the present invention utilizes panels which do not form a closed surface, but are cantilevered from the rear of the vehicle, as depicted in FIG. 1 and FIG. 2. Geometry for the top panel 1 and the side panels 3 could conceivably be full surfaces which meet to form a closed solid figure, as depicted in FIG. 4, but are currently envisioned to be partial portions of the desired aerodynamic geometry such that no closure is formed at the aft end of the panel structure.

Figure 5:
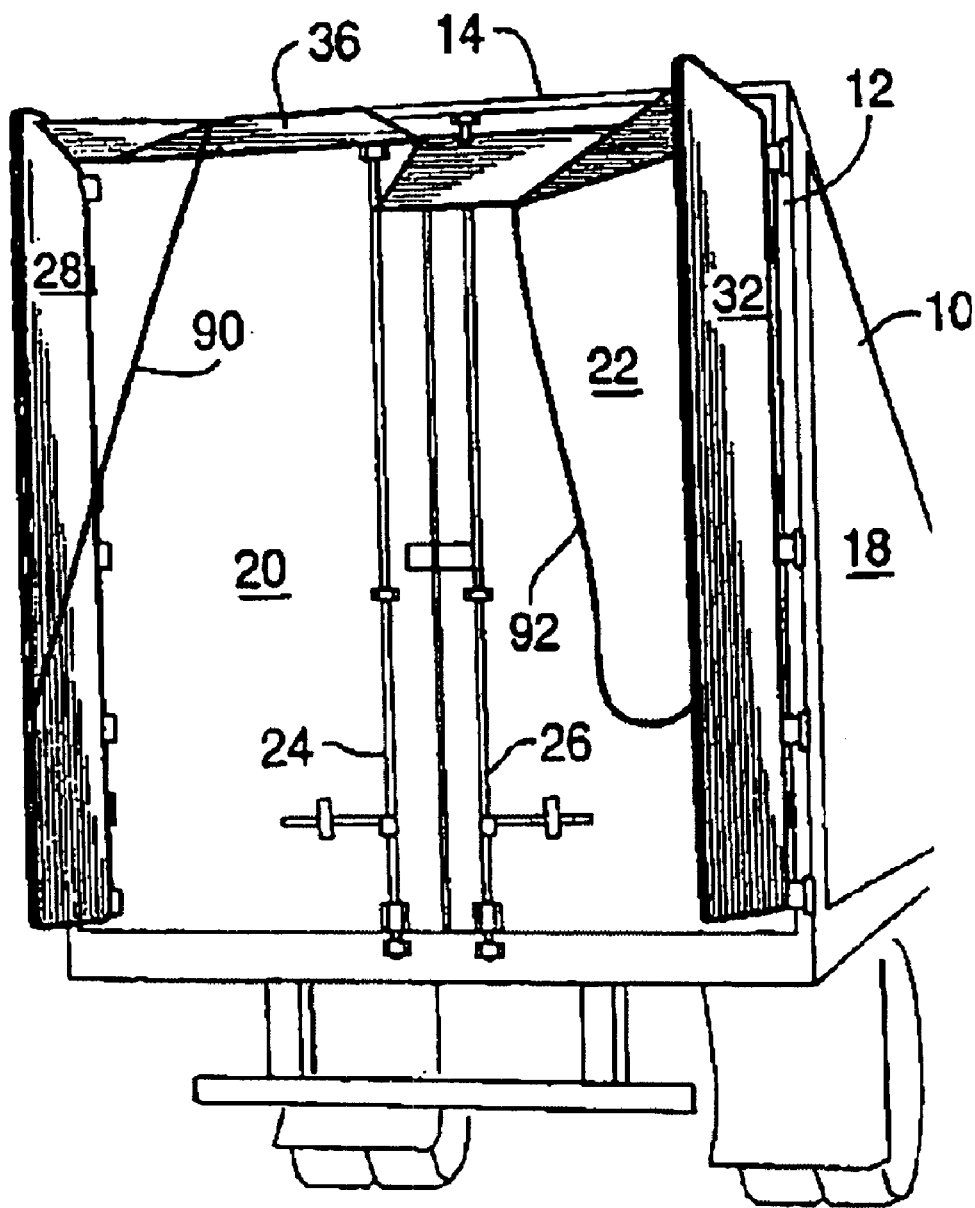
FIG. 5 depicts an example of a hinged, perforated panel mounting embodiment.

One example of a mounting technique for top panel 1 and side panels 3 is described by U.S. Pat. No. 5,498,059 by Switlik, hereby incorporated by reference into the present application. In Columns 9, line 1 through 18, line 65, Switlik describes a system by which the panels are hinged, cantilevered, and spring-loaded, so that they may be deployed for use, and retracted when not in use. FIG. 5 herein, which is FIG. 6 from Switlik's U.S. Pat. No. 5,498,059, illustrates the hinged system, which might be utilized regardless of the selected panel geometry.

Similarly, U.S. Pat. No. 4,978,162 by Labbe' is hereby incorporated by reference into the present application, and indicates in Column 2, lines 20–23, as well as in FIG. 2 (of Labbe'), that a set of panels defined by semi-spherical geometry are effective in reducing aerodynamic drag on a vehicle. In Column 4, line 17, Labbe' suggests a semi-spherical geometry may reduce drag by as much as 54%. Again, however, in the preferred embodiment of the present invention, top panel 1 and side panels 3 are currently envisioned as only partial sections of the semi-spherical geometry described by Labbe'.

Figure 6:
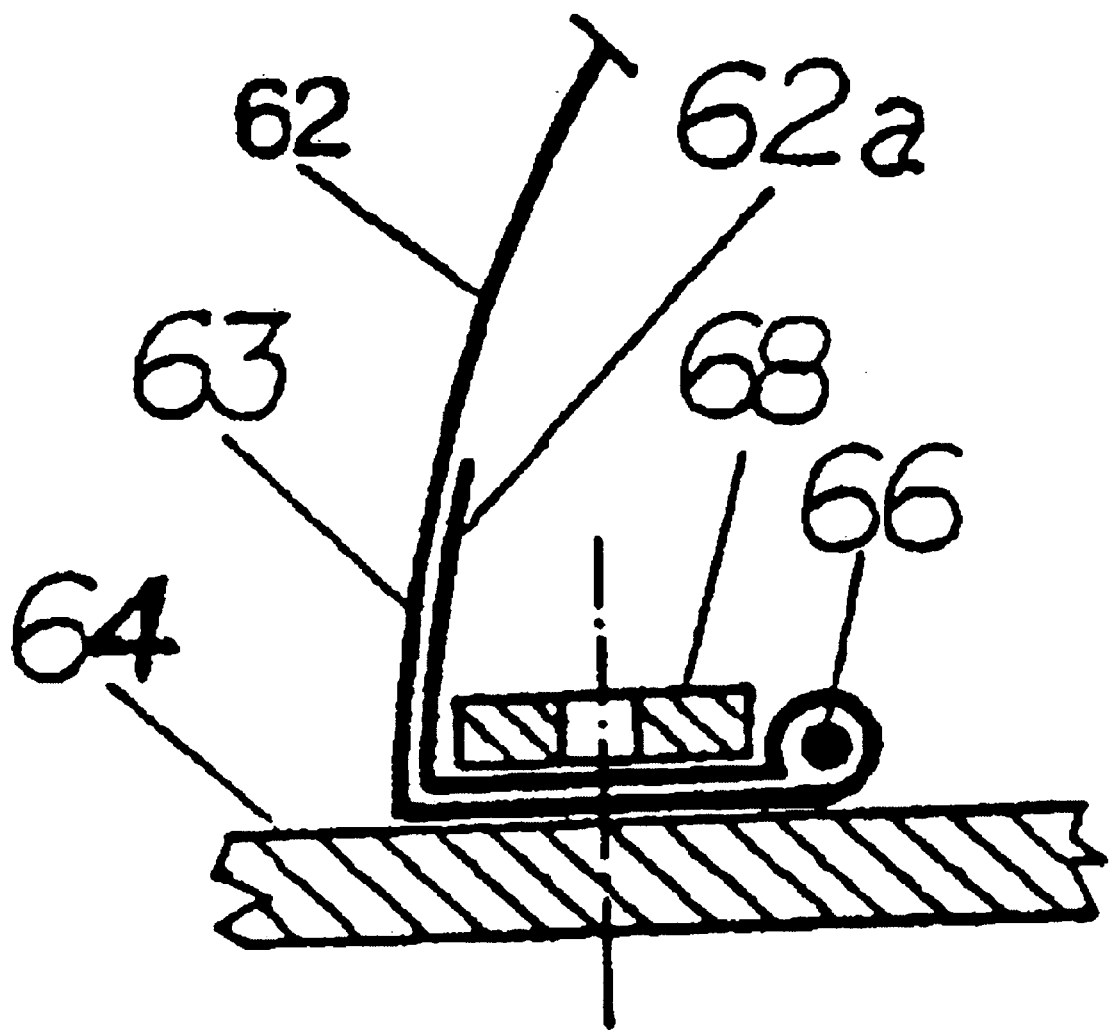
FIG. 6 depicts an a method for attaching panels to a vehicle surface.
Figure 10:
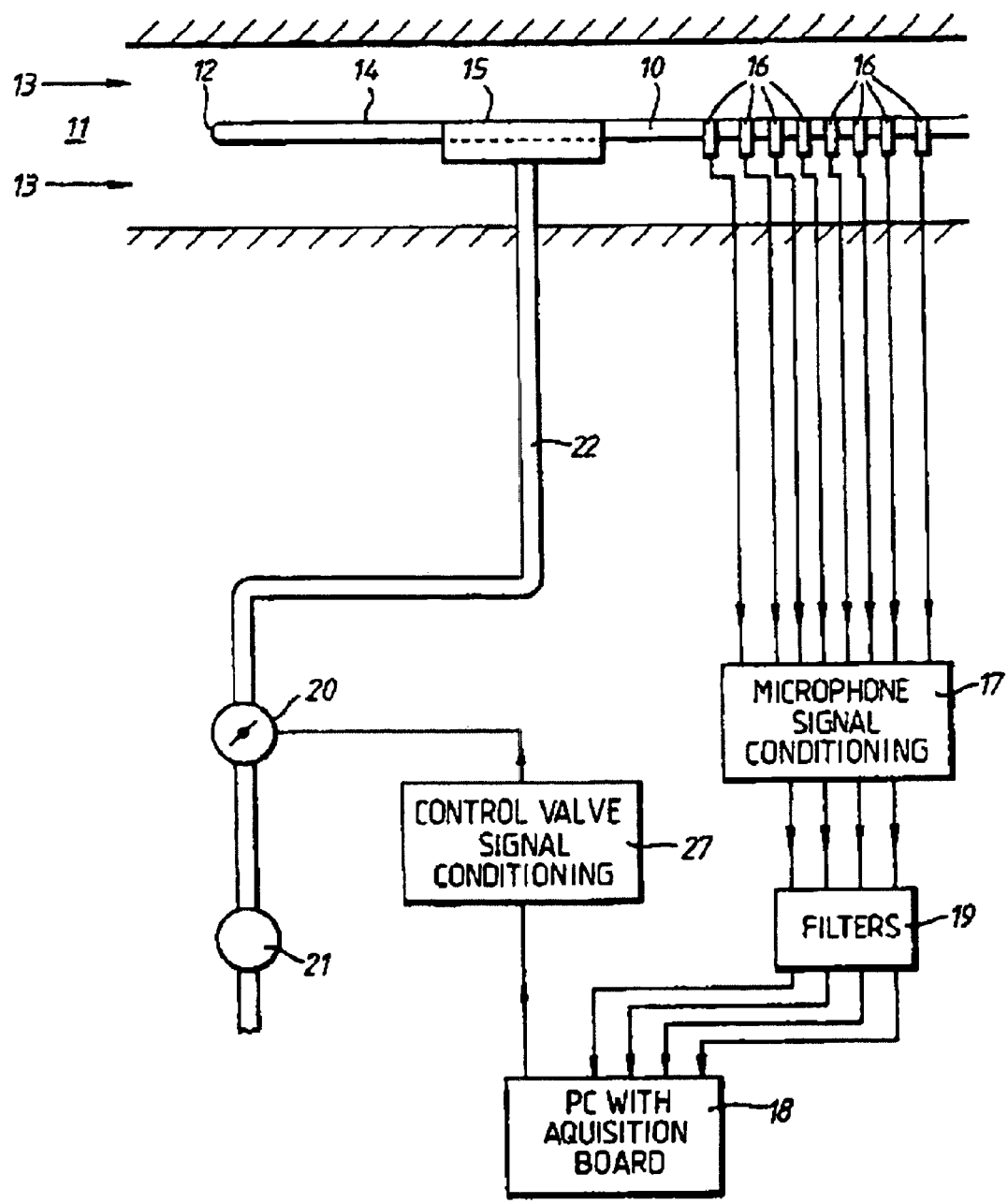
FIG. 10 depicts an embodiment for a perforated panel boundary layer suction system.

FIG. 6 of the present application, which is FIG. 10 of Labbe', U.S. Pat. No. 4,978,162, illustrates a suitable method for attaching top panel 1 and side panels 3 to the rear surface 64 of the vehicle. The attachment method is described in Column 3, lines 46 through 63. As described by Labbe', the outer portion 63 of the perforated panels can be doubled over for improved strength, and secured to the rear vehicle surface 64 by securing plates 68, through which fasteners attach. The doubled material can be reinforced by an adhesive or fusing process at edge 62a. Although Labbe' and other patents hereby incorporated into the present application provide methods by which panels may be attached to the vehicle, one skilled in the art would certainly envision any number of appropriate alternative methods of structural assembly.

Figure 7:
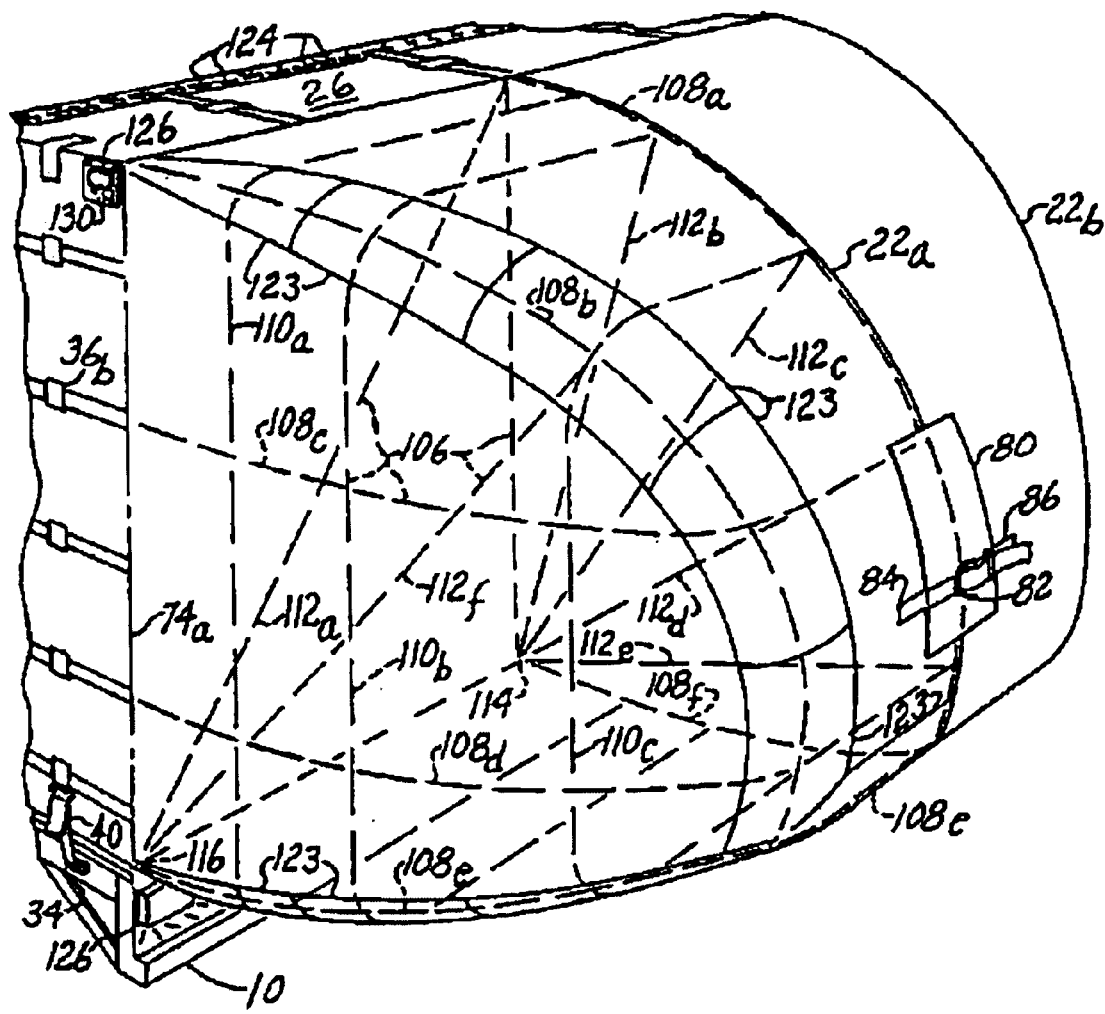
FIG. 7 depicts the three dimensional contour of a suitable perforated panel geometry.

The best mode of panel geometry is suggested by Elliott, Sr. et al., in U.S. Pat. No. 5,058,945, hereby incorporated by reference into the present application. FIG. 7 of the present invention is FIG. 11 from Elliott, Sr., which illustrates the three-dimensional shape of the panel construction, although again forming a closed solid. The present invention may utilize the panel curvature defined by Elliott, Sr. or others, but only envisions partial sections of the defined geometry such that top panel 1 and side panels 3 are cantilevered behind the vehicle. In alternate embodiments, a bottom panel is also envisioned.

Figure 8:
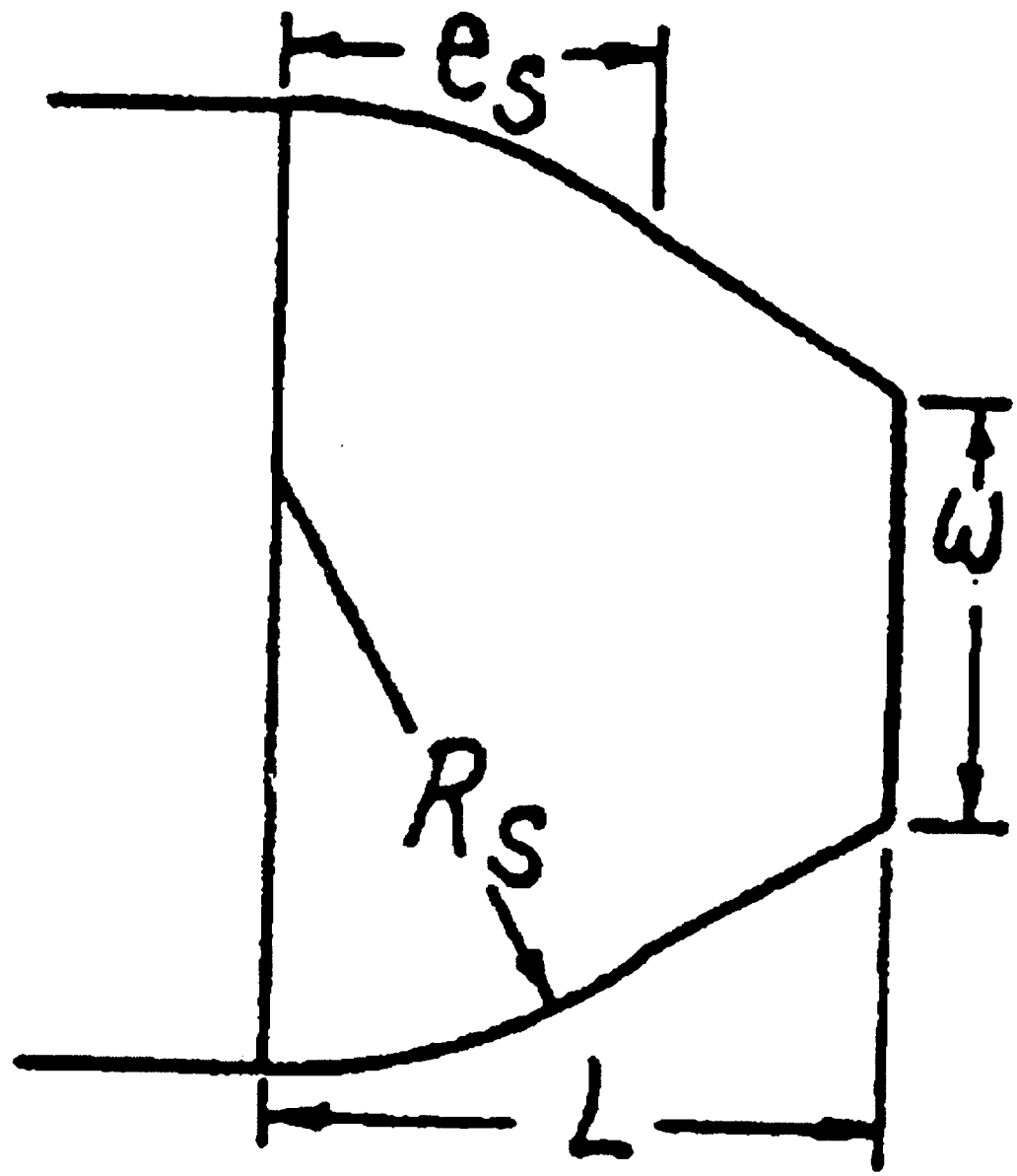
FIG. 8 depicts a side view of one embodiment of the FIG. 7 geometry.
Figure 9:
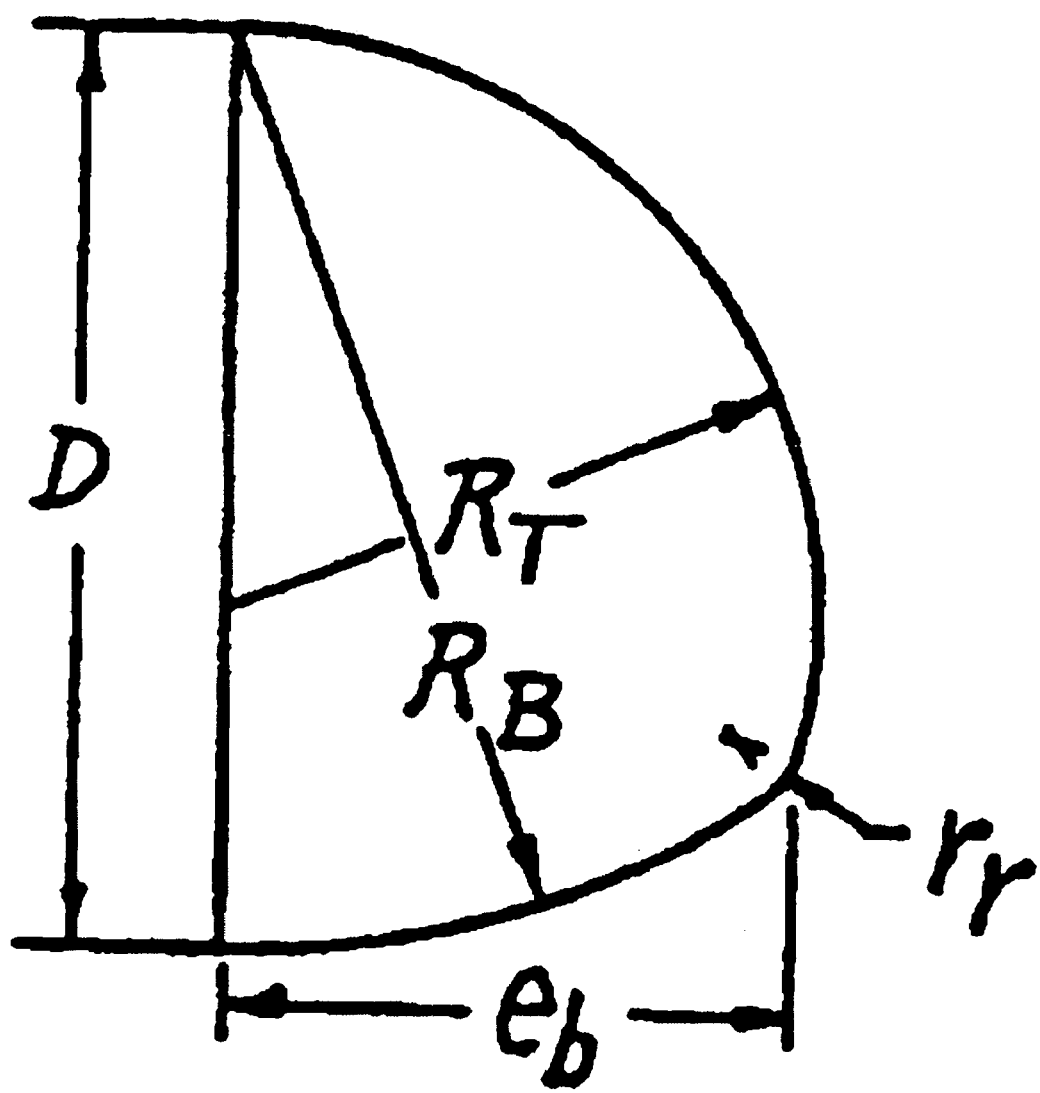
FIG. 9 depicts a side view of another embodiment of the FIG. 7 geometry.

FIG. 8 and FIG. 9 of the present application are FIG. 17 and FIG. 23 of Elliott, Sr. (U.S. Pat. No. 5,058,945), respectively, which help to define appropriate geometries for the present invention, in conjunction with TABLE I of Elliott, Sr. TABLE I provides definition for the variables shown in FIG. 8 and FIG. 9. In Column 15, lines 10–27, Elliott, Sr. suggests the drag reduction produced by the geometry of FIG. 8 or FIG. 9 should be at least 14 percent. This estimate seems to be more substantially supported by test results than does the 54 percent drag reduction estimate accorded the semi-spherical geometry by Labbe'.

To describe an embodiment of the perforated panels and suction system, U.S. Pat. No. 5,222,698, by Nelson et al., is hereby incorporated by reference into the present application. FIG. 10 herein, which is FIG. 1 of Nelson, illustrates an elaborate system, which includes piping 22, a control valve 20, and a suction pump 21. Nelson suggests in Column 2, lines 37–39, that the perforated panel should have a large number of very small holes, approximately 0.1 mm in diameter. Construction of the suction system, with suggested supporting instrumentation, is described by Nelson in Column 2, line 4, through Column 4, line 60. In Column 4, lines 34 through 42, Nelson notes that suction may be provided by a centrifugal pump, or other types of pumps or means for pumping.

Another embodiment of the suction and control system is described in U.S. Pat. No. 6,068,328 by Gazdzinski, which is hereby incorporated by reference into the present application. Gazdzinski describes a system which may be more ideal for ground based vehicle use. The system described by Gazdzinski utilizes a series of external perforation arrays and suction sources controlled by a signal processor or microprocessor. Gazdzinski's system provides for localized dynamic tuning of the boundary layer flow, and is responsive to parametric inputs other than those from the acoustic detectors. Gazdzinski's invention utilizes existing vehicular systems to help reduce drag and increase fuel economy, dynamically adapting and controlling suction based on operational and environmental conditions, with essentially no action or intervention from the vehicle operator. Gazdzinski's system is described in U.S. Pat. No. 6,068,328 in Column 5, line 19, through Column 12, line 11. The Gazdzinski invention is suitable for use in the present invention to provide for variable suction depending on vehicle speed, as well as controlled suction pumping to modify the air cushion for braking or steering.

Regardless of whether digital signal processors, or microprocessors, are used to control the boundary layer suction system, the air suctioned through the perforated panels becomes the source for the air cushion boost on the underside of the vehicle. The suctioned air is pumped by the boundary layer suction system hardware to the air cushion, using a system of piping similar to the one described by Nelson in U.S. Pat. No. 5,222,698 (above). The suction system hardware (e.g. centrifugal pump, or other means for air suction) serves two purposes as it pulls air from the perforated panel boundary layer, and exhausts it to the air cushion. Only one pump (i.e. suction means) and one energy source is required, due to the configuration of the present invention. Along the underside perimeter of the vehicle, a skirt apparatus is deployed to create and control the air cushion. A computer control system, e.g. the system described by Gazdzinski, may link and relate the magnitude of the air cushion with acceleration and braking, in order to maximize the necessary or optimum traction of the tires, belts, or treads.

Through the transfer of air suctioned from the drag reduction system to the air cushion, which applies a lifting load to the vehicle, the present invention reduces tire loading, thereby decreasing wheel friction losses, as well as highway road wear. The decrease in wheel friction losses, combined with the base flow suction, produces a greater drag reduction than either one alone. In addition, power is used in an efficient manner by the pump, which suctions the boundary layer while simultaneously creating the air cushion. The energy used is significantly less than what would be required by operating the two systems independently, therefore the invention provides not only benefits in drag reduction, tire wear and road wear, but also in significant net fuel savings.

The air cushion is produced by pumping air into a volume underneath the vehicle (e.g. truck, trailer, train, tank, car, boat, ship, etc.), which is sealed as well as practicable by a skirt substantially surrounding the lower perimeter of the vehicle. The air cushion skirt can be constructed and attached to the vehicle by any number of methods readily conceivable by one skilled in the mechanical arts. U.S. Pat. No. 6,200,069 by Miller, hereby incorporated by reference into the present application, describes an applicable hovercraft skirt which forms a perimeter around the lower portion of the vehicle. In Column 2, lines 63–67, Miller suggests that the skirt may be a bag or tube skirt, a segmented or finger skirt, a jupe or cell skirt, or other such skirt designs as may prove convenient, and could be made of a heavy rubberized fabric. Material and method of construction should be selected so that the skirt is firm enough to contain air under light pressure, but flexible enough to negotiate bumps, obstructions in the roadway, and sharp changes in elevation.

Pressure within the air cushion region should be on the order of 0.4 to 0.5 psi to produce the desired ground effects benefits without sacrificing safety. For a typical trailer of dimensions 40 feet by 8 feet, and weighing 80,000 pounds, a pressure of 1.74 psi would be required to lift the vehicle. A lifting force of approximately one-fourth of that value (0.435 psi) would significantly reduce the load on the vehicle's propulsion system without necessarily affecting safe control of the vehicle.

Figure 11:
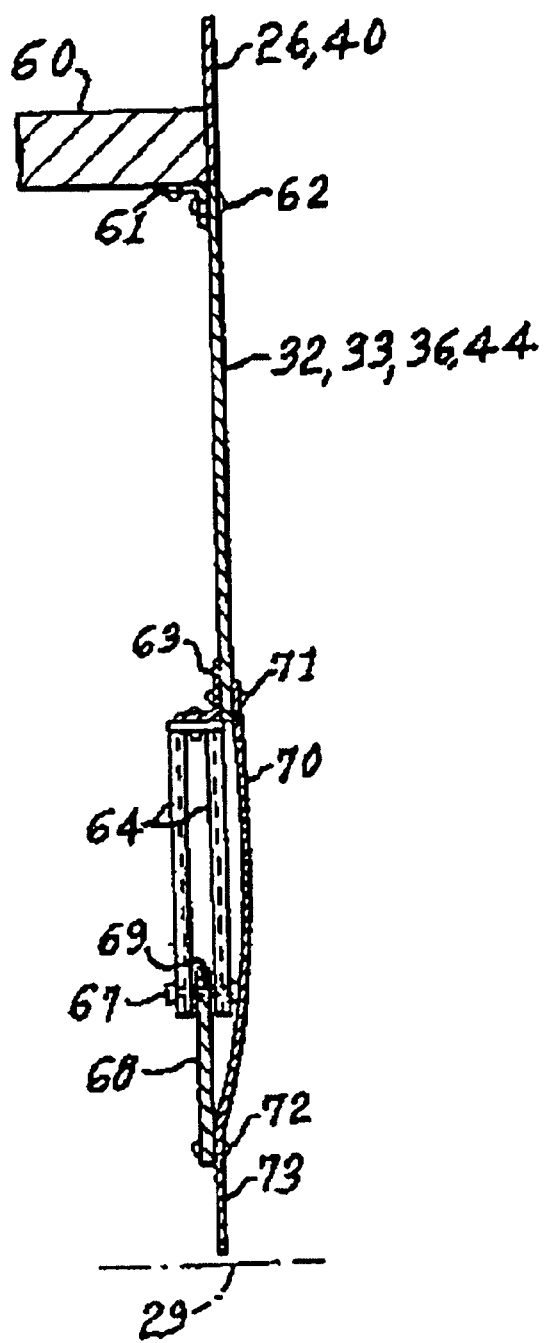
FIG. 11 depicts a structure and assembly for a surface effects vehicle skirt.

To effectively maintain the air cushion, the skirt should be made to ride as closely to ground level as possible in order to prevent considerable air leakage. U.S. Pat. No. 4,746,160 by Wiesemeyer, hereby incorporated into the present application, describes a set of skirts designed to aerodynamically streamline a truck and trailer. The skirts described by Wiesemeyer would be suitable for use with the present invention to define and contain the air cushion, and represent the best mode envisioned at this time. FIG. 11 of this application is FIG. 9 from Wiesemeyer's patent. FIG. 11, along with Wiesemeyer's description in Column 5, lines 1–60, describes the structure and assembly of a skirt suitable for this application. Skirts of this design extend the entire length of both sides of the vehicle, as well as covering the width of the front and back so as to entirely enclose the lower periphery of the vehicle.

Alternatively, U.S. Pat. No. 4,611,847 by Sullivan, which is also hereby incorporated into the present application, describes an inflatable and extendable skirt which may be suitable for use with the present invention. Although more elaborate and probably more expensive to manufacture and maintain, Sullivan's inflatable skirt may be tied to the microprocessor system so that the skirt (and thereby the air cushion) can be modified with braking, acceleration, steering, and other changes in vehicular conditions. Sullivan's skirt is described in Column 2, line 14, through Column 3, line 55. Sullivan notes in Column 3, lines 15–21, that the skirt may be automatically activated at certain speeds, or deflated and retracted when the vehicle's brakes are applied.

The present invention can be applied to automobiles as well as to commercial or large trucks. For automobiles, including but not limited to private cars, sport utility vehicles, light trucks and the like traveling at highway speeds, the invention offers similar advantages of fuel efficiency, reduced tire wear, and decreased road wear.

The present invention can be utilized to increase the lifting and carrying capability of heavy or ultra heavy lift vehicles. Currently, heavy loads carried by such vehicles are dissipated by large numbers of wheels and/or axles, larger tires or treads, or combinations thereof. The present invention reduces the load placed on the devices in contact with the ground (e.g. the tires, treads, or belts), thereby allowing for the carriage of greater weight, reduced deterioration of the road surface, increased fuel efficiency, increased speed, reduced wear on the wheels or treads, or a combination of such advantages.

The invention also facilitates the movement of such heavy or ultra heavy conveyance over unimproved or irregular surfaces. It allows a variety of vehicles to traverse off-road, unimproved, soft, or otherwise irregular surfaces by reducing the loading on the wheels, tires, treads, or belts. One example of such an application is the movement of heavy cargo or containers from commercial vessels or ports inland and/or away from docks in Third World countries or other underdeveloped areas.

Military applications for the present invention include movement of large flat bed vehicles carrying tanks, artillery, or containers economically and efficiently over off-road terrain, or faster over prepared surfaces, thereby increasing logistical options.

The present invention can also be applied in rail yards and/or port areas where cargo containers are transported, marshaled, assembled, stored, packed, or otherwise handled. Railroad train tracks can be specifically designed to maximize the surface area upon which an air cushion can operate in conjunction with typical train wheels. Using the present invention, trains can carry greater loads more economically and faster, with lower drag and improved fuel efficiency at traveling speeds.

Figure 12:
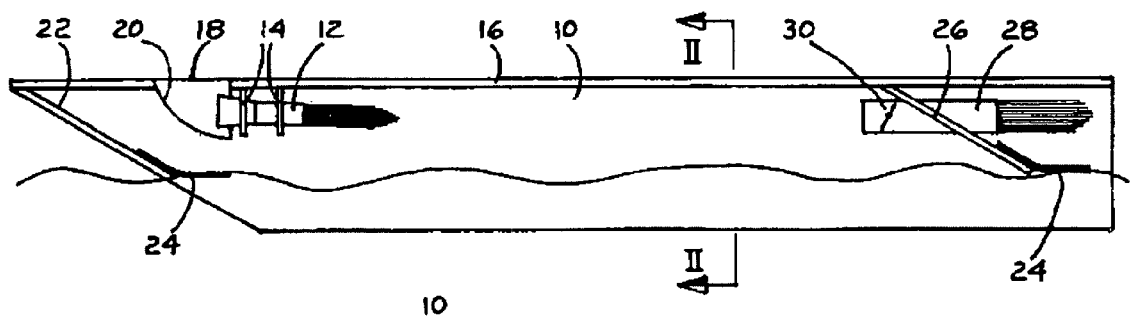
FIG. 12 depicts a sectional side view of a surface effects boat.
Figure 13:
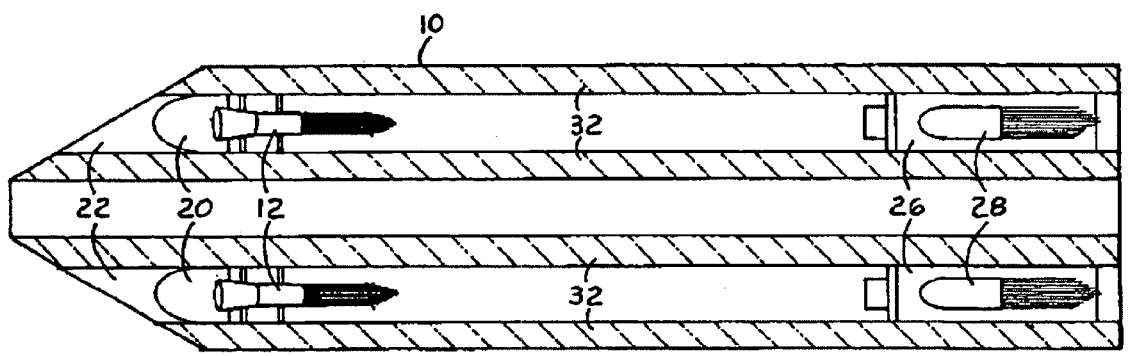
FIG. 13 depicts a cross-sectional top view of a surface effects boat.
Figure 14:
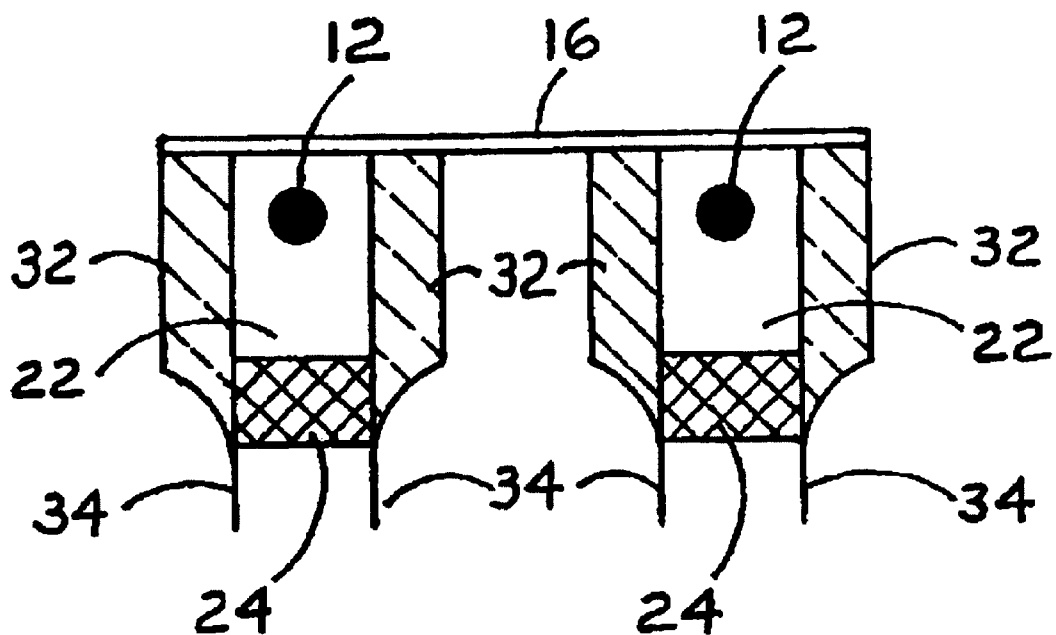
FIG. 14 depicts a cross-sectional end (front or rear) view of a surface effects boat along lines II—II of FIG. 12.

Similarly, propeller-driven boats and ships can utilize the invention to reduce wind effects which cause drag on the water-craft, while simultaneously decreasing draft. Decreased draft can result in improved fuel efficiency, as well as a safer, drier, and more comfortable ride through the water. U.S. Pat. No. 6,220,193 by Dilks is hereby incorporated into the present application, to the extent that its teachings are not contrary to those in this application, to illustrate possible construction of a boat using the present invention. FIG. 12, FIG. 13, and FIG. 14 of the present application are FIGS. 1, 2, and 3 of Dilks' patent. Keels 32 and flexible trailing seals 24 serve the same function on the boat embodiment as skirts serve on the truck/trailer configuration described above. A difference between Dilks' invention and the preferred boat embodiment of the present invention is that lift (i.e. surface effect) in the present invention is provided by a drag reduction system as described for the truck embodiment above, as opposed to the jet engine 12 of the Dilks invention, and propulsion in the present invention is provided by a propeller. As with the truck/trailer embodiment, aerodynamic drag on the upper portion of the boat (out of the water) is reduced by means of a porous panel suction system. Meanwhile, the suction system provides lift to reduce loading on the propulsion device (e.g. propeller), while additionally reducing fluid drag on the body of the boat, which rides higher in the water as a result of the lift provided.

In addition to the physical embodiments of the invention as described above, a method for modifying a vehicle as described is hereby presented. This method minimally entails the steps of attaching perforated panels to a vehicle to improve its aerodynamic shape (thereby reducing drag on the vehicle), utilizing a suction system to further reduce drag through boundary layer flow control, then using the energy thereby expended, suction system hardware, and suctioned air to partially lift the vehicle, producing the variety of benefits described above.

The descriptions of the present invention represent the invention in its preferred embodiments. It should be understood that additional changes in the details, materials, process steps, and parts arrangement may be made by those skilled in the art within the principle and scope of the invention as expressed in the appended claims.

Although the invention has been described relative to specific embodiments, there are numerous variations and modifications that will be readily apparent to those skilled in the art in light of light of the above teachings. It is therefore to be understood that, within the scope of the appended claims, the invention may be practiced other than as specifically described.

The invention claimed is:

1. A surface effects conveyance comprising:
   a vehicle;
   means for reducing aerodynamic drag on the vehicle, which comprises a perforated boundary layer suction panel attached to the vehicle, and means for producing suction, configured for suctioning air through the perforated boundary layer suction panel; and
   means for applying a lifting force to the vehicle, which is operatively connected to the means for reducing aerodynamic drag on the vehicle through shared use of hardware, energy, and air.

2. A surface effects conveyance according to claim 1, further comprising a sealably attached skirt substantially surrounding a lower perimeter of the vehicle, and extending downwardly from the lower perimeter of the vehicle to a surface below the vehicle, such that air can be substantially contained by an underside of the vehicle, the sealably attached skirt substantially surrounding a lower perimeter of the vehicle, and the surface below the vehicle.

3. A surface effects conveyance according to claim 2, further comprising a cushion of air substantially enclosed by an underside of the vehicle, the sealably attached skirt substantially surrounding a lower perimeter of the vehicle, and a surface below the vehicle.

4. A surface effects conveyance according to claim 3, wherein the cushion of air substantially enclosed by an underside of the vehicle, the sealably attached skirt substantially surrounding a lower perimeter of the vehicle, and a surface below the vehicle, is configured to apply a force to the underside of the vehicle at least sufficient to partially lift the vehicle.

5. A surface effects conveyance according to claim 4, further comprising means for conveying air from one location to another, configured for transferring air from the means for producing suction to the cushion of air substantially enclosed by an underside of the vehicle, the sealably attached skirt substantially surrounding a lower perimeter of the vehicle, and a surface below the vehicle.

6. A surface effects conveyance according to claim 5, wherein the means for producing suction, and the means for conveying air from one location to another, comprise a shared pump.

7. A surface effects conveyance according to claim 6, further comprising an electronic control system, configured for controlling operation of the means for producing suction, and for controlling operation of the means for conveying air from one location to another.

8. A surface effects conveyance according to claim 7, wherein the vehicle is a ground based vehicle, selected from the group consisting of trucks, trains, trailers, tanks, and cars.

9. A surface effects conveyance according to claim 8, wherein the sealably attached skirt substantially surrounding a lower perimeter of the vehicle is inflatable, and is configured to extend downwardly toward a surface below the vehicle as it becomes inflated.

10. A method for making a surface effects conveyance, which comprises the steps of:
    attaching a perforated panel to a vehicle to improve its aerodynamic contour;
    sealably attaching a skirt to a lower perimeter of the vehicle, such that the skirt is configured to substantially surround the lower perimeter of the vehicle and the surface below the vehicle, the skirt extending downwardly from the lower perimeter of the vehicle to a surface below the vehicle, such that air can be substantially contained by an underside of the vehicle;
    suctioning air through the perforated panel to reduce aerodynamic drag on the vehicle;
    transferring the air suctioned through the perforated panel to a volume substantially enclosed by an underside of the vehicle, the sealably attached skirt substantially surrounding a lower perimeter of the vehicle, and a surface below the vehicle, to create a cushion of air within the substantially enclosed volume, configured to apply a force to the underside of the vehicle at least sufficient to partially lift the vehicle; and
    controlling the transfer of air suctioned through the perforated panel to the substantially enclosed volume, such that a force applied to the underside of the vehicle by the cushion of air may be modified as desired.

11. A method for making a surface effects conveyance according to claim 10, wherein the control of the transfer of suctioned air is accomplished through the use of an electronic control system, configured for controlling operation of the means for producing suction, and for controlling operation of the means for conveying air from one location to another.

12. A method for making a surface effects conveyance according to claim 11, wherein the vehicle is a ground based vehicle, selected from the group consisting of trucks, trains, trailers, tanks, and cars.

13. A method for making a surface effects conveyance according to claim 12, wherein the sealably attached skirt substantially surrounding a lower perimeter of the vehicle is inflatable, and is configured to extend downwardly toward a surface below the vehicle as it becomes inflated.

* * * * *